UNITED STATES PATENT OFFICE.

EMIL REBER, OF BASEL, SWITZERLAND, ASSIGNOR TO SOCIETY OF CHEMICAL INDUSTRY IN BASLE, OF BASEL, SWITZERLAND.

DISAZODYESTUFFS ABLE TO BE CHROMATED.

1,338,397.   Specification of Letters Patent.   Patented Apr. 27, 1920.

No Drawing.   Application filed August 24, 1918.   Serial No. 251,292.

*To all whom it may concern:*

Be it known that I, EMIL REBER, a citizen of the Swiss Republic, and resident of Basel, Switzerland, have invented new and useful Disazodyestuffs Able to be Chromated, of which the following is a full, clear, and exact specification.

I have found, that new disazodyestuffs of the pyrazolone series, which are able to be chromated, can be obtained by diazotizing the monoazodyestuffs derived from a diazobody and a further diazotizable amino component, as for instance, anilin, toluidin, paraxylidin, cresidin, naphthylamin, naphthylaminsulfonic acid of Cleve, etc., and combining the resulting diazoazocompound with oxy-carboxyarylpyrazolonecompounds. The disazodyestuffs thus obtained are distinguished by the prominent fastness of their chromated dyeings to fulling and potting, resulting from the simultaneous presence of a hydroxyl group and of a carboxyl group in the aryl radical of the pyrazolone-component. The tints of the new disazodyestuffs vary according to the monoazodyestuffs employed as parent materials from red to orange and brownish red. Particularly valuable are the disazodyestuffs derived from monoazodyestuffs obtained by combining a diazobody with cresidin, since these disazodyestuffs furnish fast red dyeings of a degree of purity which could not be attained heretofore with chromatable dyestuffs. Owing to the extern position of the chromatable groups in the dyestuff molecule, that is to say, owing to the fact that the said —OH and COOH groups able to form chromium lakes are in an aromatic nucleus different from the chromophore carriers, there results the further advantage that the chromated dyeings differ not essentially in color from the direct dyeings, when no further chromatable group has been introduced into the dyestuff, for instance, by employing as parent material a monoazodyestuff derived from an ortho-oxydiazobody.

The new dyestuffs constitute, in a dry state, orange to brown powders soluble in water with orange to brown-red colorations and in concentrated sulfuric acid with red to brown colorations.

The oxy-carboxy-aryl-pyrazolones employed as parent materials can be prepared by condensing the corresponding hydrazinderivatives as for instance the 2-oxy-3-carboxy-5-sulfo-1-phenylhydrazin

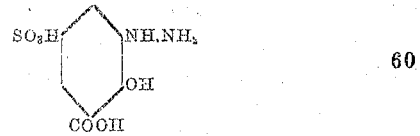

or the 4-oxy-3-carboxy-1-phenylhydrazin

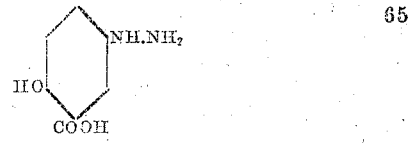

with the equivalent quantities of acetacetic ester in an aqueous solution, while such a quantity of sodium carbonate is successively added that there results a clear solution with an even alkaline reaction on litmus, saponifying the hydrazones thus obtained, for instance, with cold soda lye and precipitating the oxy-carboxy-arylpyrazolone with an acid. The 1-(5'-sulfo-3'-carboxy-2'-oxy)-phenyl-3-methyl-5-pyrazolone thus obtained dissolves in hot water, difficultly in cold water and very easily in dilute sodium hydroxid, while the 1-(4'-oxy-3'-carboxy)-phenyl-3-methyl-5-pyrazolone dissolves difficultly in hot water, but easily in dilute sodium hydroxid. Both these oxy-carboxy-phenyl-pyrazolones give with sodium nitrite, in an acid solution, yellow nitroso derivatives.

The invention is illustrated by the following examples.

*Example 1.*

The diazoderivative derived from 22.5 parts of orthoaminoazotoluene corresponding to the formula

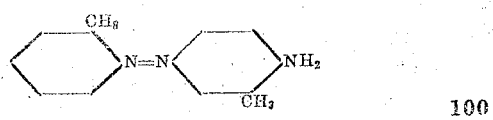

is added to a solution of 31.5 parts of 1-(5'-sulfo-3'-carboxy-2'-oxy)-phenyl-3-methyl-5-pyrazolone made alkaline with sodium carbonate. The dyestuff is precipitated from the resulting deep-orange colored solution by an addition of common salt, in form of an orange precipitate. The dyestuff constitutes in a dry state, an orange powder dissolving in water to orange and in concentrated sulfuric acid to fuchsin-red solutions.

It dyes wool, in an acid bath, orange tints turning, on subsequent chromating, to a light-brownish-orange fast to fulling and to potting.

Example 2.

The monoazodyestuff prepared in the known manner from 17.3 parts of diazotized ortho-sulfanilic acid and 15.1 parts of cresidin corresponding to the formula

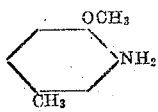

is further diazotized with 7 parts of sodium nitrite and the resulting diazoazocompound is combined with a solution of 31.5 parts of 1 (5'-sulfo-3'-carboxy-2'-oxy)-phenyl-3-methyl-5-pyrazolone, made alkaline with sodium carbonate. The disazodyestuff constitutes in a dry state a red powder dissolving in water to a red solution and in concentrated sulfuric acid to a reddish-blue solution. It dyes wool, in an acid bath, red tints becoming, on subsequent chromating, intensively fast to fulling and to potting.

Example 3.

The monoazodyestuff derived from diazosulfosalicylic acid

and cresidin corresponding to the formula

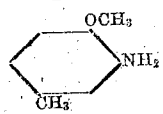

is diazotized in a known manner and the resulting diazoazocompound is combined with the equivalent quantity of 1(4'-oxy-3'-carboxy)-phenyl-3-methyl-5-pyrazolone. The dyestuff separated by addition of common salt constitutes, in a dry state, a red powder dissolving in water to a red solution and in concentrated sulfuric acid to a reddish-blue solution. It dyes wool, in an acid bath, red tints turning, on subsequent chromating, to a claret fast to fulling and to potting.

Example 4.

30.7 parts of the monoazodyestuff derived from paradiazosalicylic acid and alpha-naphthylamin are diazotized with 7 parts of sodium nitrite and the resulting diazoazocompound is combined with a solution of 31.5 parts of 1(5'-sulfo-3'-carboxy-2'-oxy)-phenyl-3-methyl-5-pyrazolone made alkaline with sodium carbonate. The dyestuff constitutes, in a dry state, a red-brown powder dissolving in water to a brown-red solution and in concentrated sulfuric acid to a greenish-blue solution. It dyes wool, in an acid bath, brownish-red tints turning, on subsequent chromating, to a brown fast to fulling and to potting.

What I claim is:

1. As new products, the herein described disazodyestuffs, able to be chromated, derived from an aromatic diazoazocompound and an oxy-carboxy-aryl-pyrazolonecompound, which constitute in a dry state, orange to brown powders dissolving in water with orange to brown-red colorations and in concentrated sulfuric acid with red to blue colorations and dye wool, in an acid bath, clear red to orange and brownish red tints becoming, on subsequent chromating, fast to fulling and to potting.

2. As new products, the herein described red disazodyestuffs able to be chromated, derived from a diazotized monoazodyestuff resulting from the combination of a diazobody with cresidin and from an oxycarboxy-arylpyrazolone compound, which constitute in a dry state red powders dissolving in water to red solutions and in concentrated sulfuric acid to reddish blue solutions and dyeing wool in an acid bath, clear tints becoming, on subsequent chromating, fast to fulling and to potting.

3. As a new article of manufacture, the herein described disazodyestuff able to be chromated, and corresponding to the formula

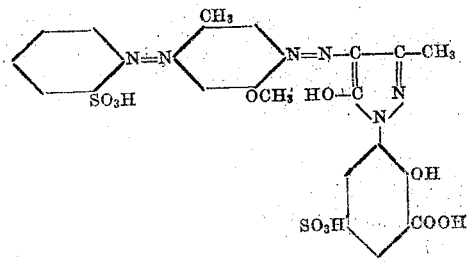

which constitutes, in a dry state, a red powder soluble in water to a red solution and in concentrated sulfuric acid to a reddish-blue solution and dyes wool, in an acid bath, red tints becoming, on subsequent chromating, fast to fulling and to potting.

In witness whereof I have hereunto signed my name this third day of August 1918, in the presence of two subscribing witnesses.

EMIL REBER.

Witnesses:
 H. H. DICK,
 AMAND RITTER.